US008621439B2

(12) United States Patent
Krause et al.

(10) Patent No.: US 8,621,439 B2
(45) Date of Patent: Dec. 31, 2013

(54) MODERN APPLICATION TRACING

(75) Inventors: Michael H. Krause, Redmond, WA (US); Zoran Dimov, Seattle, WA (US); Alex Bendetov, Redmond, WA (US); Haseeb Ahmed, Redmond, WA (US); Matthew R. Ayers, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 181 days.

(21) Appl. No.: 13/225,924

(22) Filed: Sep. 6, 2011

(65) Prior Publication Data

US 2013/0061212 A1    Mar. 7, 2013

(51) Int. Cl.
*G06F 9/44* (2006.01)

(52) U.S. Cl.
USPC .......................................... 717/128

(58) Field of Classification Search
USPC .......................................... 717/128
See application file for complete search history.

(56) References Cited

U.S. PATENT DOCUMENTS

| | | | |
|---|---|---|---|
| 7,392,505 B2 * | 6/2008 | Ciapala et al. | 717/106 |
| 7,441,234 B2 | 10/2008 | Cwalina et al. | |
| 7,484,221 B2 * | 1/2009 | Rivera et al. | 719/318 |
| 7,516,209 B2 | 4/2009 | Raghuraman et al. | |
| 7,606,814 B2 | 10/2009 | Deily et al. | |
| 7,617,074 B2 | 11/2009 | Beish et al. | |
| 2002/0073063 A1 * | 6/2002 | Faraj | 707/1 |
| 2004/0098642 A1 | 5/2004 | Kaszycki et al. | |
| 2008/0126828 A1 * | 5/2008 | Girouard et al. | 714/2 |
| 2009/0013312 A1 * | 1/2009 | Albert et al. | 717/128 |
| 2011/0067008 A1 * | 3/2011 | Srivastava et al. | 717/128 |

OTHER PUBLICATIONS

Stricker, Scott; "Java programming with JNI"; IBM® developerWorks® website; Mar. 26, 2002.*
Brown, Keith, "Improve Manageability through Event Logging", Retrieved at <<http://msdn.microsoft.com/en-us/magazine/cc163446.aspx>>, Apr. 2007, pp. 6.

* cited by examiner

*Primary Examiner* — Anil Khatri
*Assistant Examiner* — Clint Thatcher
(74) *Attorney, Agent, or Firm* — Wolfe-SBMC

(57) ABSTRACT

Modern application tracing techniques are described herein that enable dynamic logging of events declared in a static manifest. Various events for logging can be declared in a static manifest. The static manifest may then be compiled to translate the declared events into a library of corresponding functions that can be called by "modern" applications written using dynamic code. Calls made to these functions from dynamic code are converted to corresponding static events and forwarded to existing tracing application programming interfaces (APIs) designed to handle logging of static events for "legacy" applications that use compiled code. In this manner, static functions that are compatible with tracing APIs can be created and called dynamically from dynamic code. This can occur without requiring administrative rights to install the code and while preserving existing features for legacy applications, such that a tracing log can include events from both modern applications and legacy applications.

20 Claims, 6 Drawing Sheets

MODERN APPLICATION TRACING

BACKGROUND

Developers may employ tracing of events generated in connection with executing applications to debug and troubleshoot the applications. In one traditional approach, function level logging can be employed to measure timing and other performance metrics for particular functions. Function level logging, though, does not provide granular information regarding different execution branches that may result for a particular task. A more sophisticated approach involves logging both start events and end events associated with particular tasks to capture semantics associated with responses to the different actions. Traditionally, however, event based logging of this type is handled separately by individual applications, which creates a proliferation of logs and formats that may be difficult to correlate.

Moreover, existing system wide event based logging infrastructure and techniques are directed to traditional statically complied applications such as C++ and C# applications (e.g., compiled languages and/or "legacy" applications that may be installed using administrative rights). As such, existing technology for event based logging may be incompatible with "modern" applications that take advantage of dynamic languages (e.g., non-compiled scripting languages) and/or corresponding runtime environments.

SUMMARY

Modern application tracing techniques are described herein that enable dynamic logging of events declared in a static manifest. Various events for logging can be declared in a static manifest. The static manifest may then be compiled to translate the declared events into a library of corresponding functions that can be called by "modern" applications written using dynamic code. Calls made to these functions from dynamic code are converted to corresponding static events and forwarded to existing tracing application programming interfaces (APIs) designed to handle logging of static events for "legacy" applications that use compiled code. In this manner, static functions that are compatible with tracing APIs can be created and called dynamically from dynamic code. The logging may occur without requiring administrative rights to install the dynamic code. This can occur while preserving existing features for legacy applications, such that a tracing log can include events from both modern applications and legacy applications.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Traditionally, event based logging is handled separately by individual applications and/or is limited to pre-defined events generated by static code (e.g., compiled code). Thus, existing technology for event based logging involves many disjointed application-specific logs and is incompatible with applications written using dynamic languages.

Modern application tracing techniques are described herein that enable dynamic logging of events declared in a static manifest. Various events for logging can be declared in a static manifest. The static manifest may then be compiled to translate the declared events into a library of corresponding functions that can be called by dynamic applications. Instead of logging events from dynamic code, the dynamic code calls a function in the library to handle the logging. The manifest translation produces functions that are compatible with existing technology for event based logging. In particular, the functions provide an intermediate layer between dynamic code and static tracing application programming interfaces (APIs). Calls made to these functions are converted to corresponding static events and forwarded to existing tracing APIs for logging. Accordingly, modern applications can make use of the existing tracing technology by declaring static events in a manifest and converting the manifest to produce corresponding functions that implement the logging of those events. In this manner, static functions that are compatible with tracing APIs may be created and called dynamically from dynamic code. This can occur without having to install the dynamic code using administrative privileges and while preserving existing features for legacy applications.

In the following discussion, an example environment in which modern application tracing may be employed is first described. Example procedures for modern application tracing are then described which may be employed in the example environment as well as other environments. Finally, an example system is described that represents example systems and devices that may be used to implement various embodiments of modern application tracing. Accordingly, performance of the example procedures is not limited to the example environment and the example environment is not limited to performing the example procedures.

Example Environment

Figure 1:
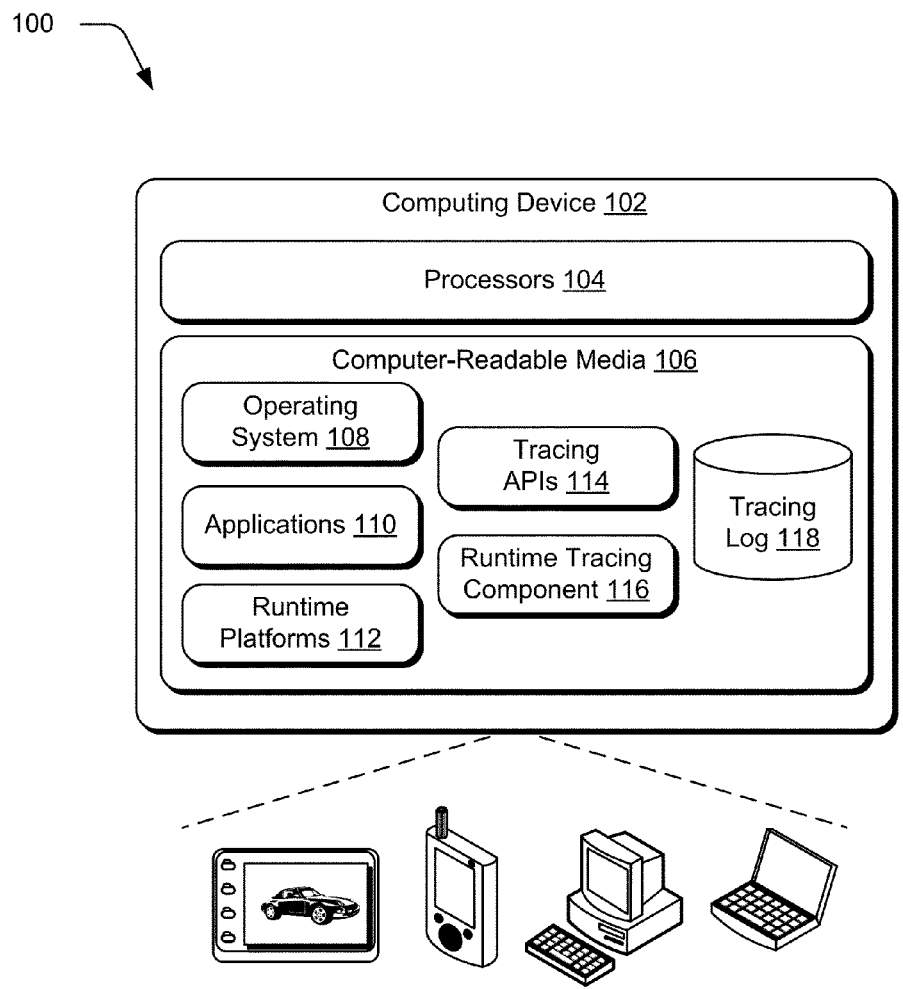
FIG. 1 is an illustration of an environment in an example implementation that is operable to employ modern application tracing techniques.

FIG. 1 illustrates an operating environment in accordance with one or more embodiments, generally at 100. The environment 100 includes a computing device 102 having one or more processors 104, one or more computer-readable media 106, an operating system 108, and one or more applications 110 that reside on the computer-readable media and which are executable by one or more processors 104. The one or more processors 104 may retrieve and execute computer-program instructions from applications 110 to provide a wide range of functionality to the computing device 102, including but not limited to office productivity, email, media management, printing, networking, web-browsing, and so forth. A variety of data and program files related to the applications 110 can also be included, examples of which include office documents, multimedia files, emails, data files, web pages, user profile and/or preference data, and so forth.

The computing device 102 may be embodied as any suitable computing system and/or device such as, by way of example and not limitation, a desktop computer, a portable computer, a tablet or slate computer, a handheld computer such as a personal digital assistant (PDA), a cell phone, a set-top box, and the like. One example of a computing system that may represent various systems and/or devices including the computing device 102 is shown and described below in FIG. 6.

The computer-readable media may include, by way of example and not limitation, forms of volatile and non-volatile memory and/or storage media that are typically associated with a computing device. Such media may include ROM, RAM, flash memory, hard disk, removable media and the like. One such configuration of a computer-readable media is signal bearing "communication media" that is configured to transmit computer-readable instructions (e.g., as a carrier wave) to the hardware of the computing device, such as via a network. The computer-readable medium may also be configured as "computer-readable storage media" that excludes mere signal transmission. Thus, computer-readable media includes both "computer-readable storage media" and "communication media" further examples of which can be found in the discussion of the example computing system of FIG. 6.

At least some of the applications 110 may be configured as runtime applications that operate through one or more runtime platforms 112 of the computing device 102. These "modern" applications may be written using dynamic scripting languages that may not be compiled, such as JavaScript. Modern applications may be distinguished in the following discussion from "legacy" applications that may be written using statically compiled languages, such as C++, C#, and so forth. The runtime platforms 112 are configured to provide respective execution environments for corresponding applications. In other words, runtime platforms 112 are configured to support the execution of programs written in a compatible computer language. Runtime platforms 112 provide a common set of features, routines, and functions for compatible applications thereby offloading coding of common tasks from application development. Runtime platforms 112 also enable portability of applications to different kinds of systems with little or no change to the dynamic script for the applications and/or without recompiling.

In at least some embodiments, a runtime platform 112 may be provided with the operating system 108 as an integrated component available on a computing device 102 having the operating system 108 installed thereon. Runtime platforms 112 may also be provided by third-party providers. Examples of runtime platforms 112 for a computing device 102 include JAVA™ runtime environment (JRE), Adobe™ Flash™, Microsoft™.NET framework, and Microsoft Silverlight™ to name a few examples.

The computing device 102 further includes one or more tracing application programming interfaces (APIs) 114 and a runtime tracing component 116 that reside on the computer-readable media and are also executable by the processor(s).

The tracing APIs 114 represent functionality through which applications 110 can invoke native operating system functionality designed to facilitate tracing and logging of events. The tracing APIs 114 represent legacy components associated with the operating system 108 that are designed for use with legacy applications that use compiled languages. For example, instrumented applications may be configured to provide tracing events that are logged in a tracing log 118 directly through the tracing APIs 114. The tracing APIs 114 may be configured to receive and process events in a predefined, expected format directly from statically compiled code of legacy applications. For example, events may be declared in a manifest that specifies the expected format and includes metadata to describe the events. Events may therefore be provided by applications and logged through the tracing APIs 114 in an expected format. The logged events may thereafter be decoded using the metadata descriptions contained in the manifest.

In accordance with modern application tracing techniques described herein, the runtime tracing component 116 represents functionality of the computing device 102 operable to enable logging of events from modern applications using native tracing functionality of the operating system 108, such as using the example tracing APIs 114. The runtime tracing component 116 may be provided as an intermediate layer situated between modern applications and the operating system 108. In general, the runtime tracing component 116 is operable to convert statically defined events to dynamically callable functions and expose the functions for use by modern applications to log events in a tracing log 118. In turn, the functions created and exposed by the runtime tracing component 116 translate calls from dynamic code to static events in an expected format that can be handled by legacy tracing APIs 114. The runtime tracing component 116 may be implemented as a standalone application as illustrated or as a component of another application. For example, the runtime tracing component 116 may be provided as an integrated component of the operating system 108.

Figure 2:
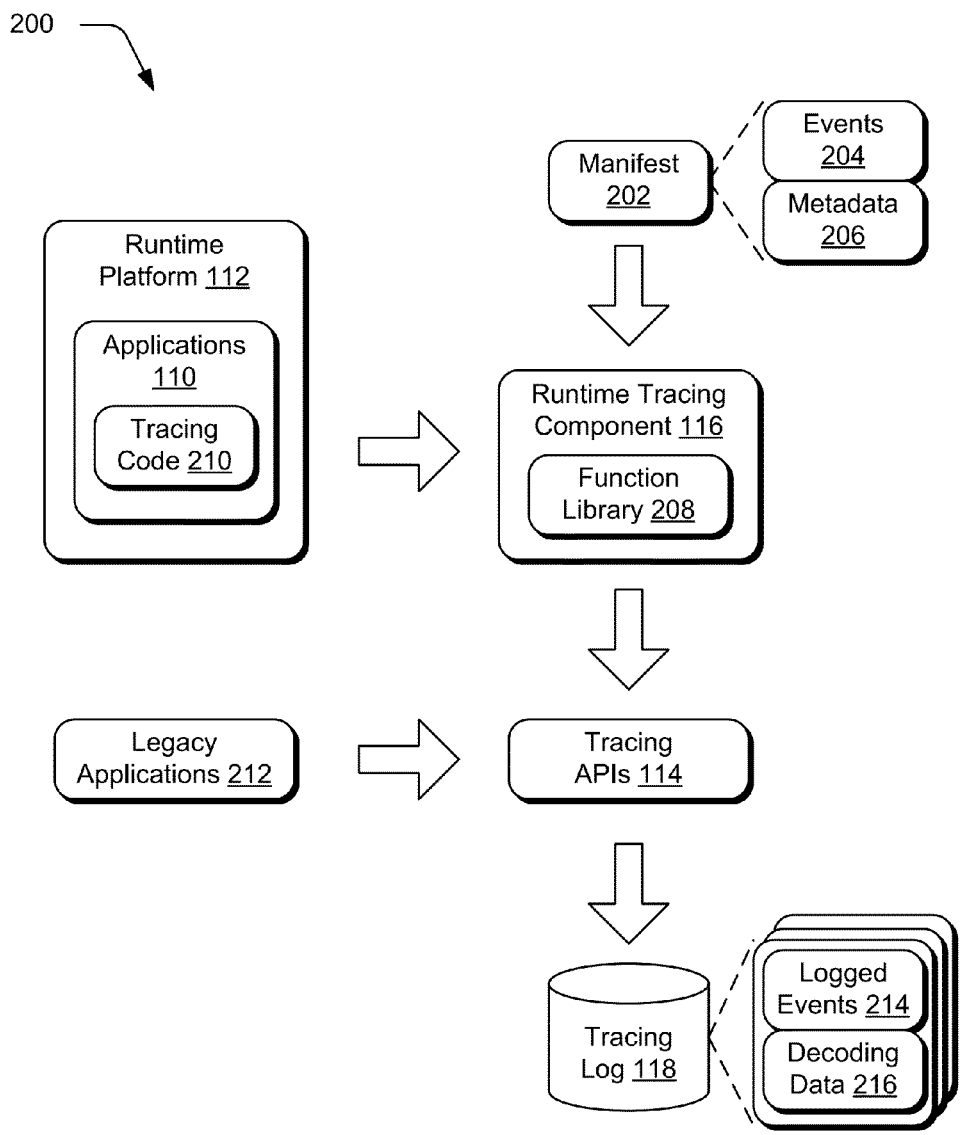
FIG. 2 is an illustration of a system in an example implementation showing example operation of a runtime tracing component of FIG. 1.

To further illustrate, consider FIG. 2 which depicts an illustration of an example scenario 200 showing example operation of a runtime tracing component 116 of FIG. 1. In particular, FIG. 2 shows a manifest 202 that may be generated to define events for tracing by an application. In particular, the manifest may define various events 204 and associate the events with metadata 206 that describes the events 204. The events 204 may be defined in terms of parameters that are passed by applications 110. The metadata 206 may be used to decode the raw log data that may be recorded as values for the parameters in an expected format without including descriptive information. For example, the metadata 206 may designate event names, data parameters associated with the events, an expected format/sequence for data parameters in log data, and so forth. Log entries may therefore contain strings of parameter values in an expected format/sequence for an event without including the contextual names, tags, and so forth defined by the metadata 206. This enables logging transactions and corresponding logs that are lightweight in terms of resource usage, e.g., memory and processing power.

For instance, a login start event may include parameters for a user name, start time, and number of attempts. Thus, an event may simply be logged as values for the name, time, and attempts. The manifest defines the expected format of these parameters, such as the sequence of the parameters. The logged values may be correlated to the event description contained in the manifest to decode the log.

In operation, the runtime tracing component 116 obtains the manifest 202 as input and produces a function library 208 based on the manifest 202. The function library 208 includes a function corresponding to each of the events that is callable by dynamic code. For example, an application 110 is shown in FIG. 2 as being implemented within a runtime platform 112. The application 110 has been instrumented with dynamic tracing code 210 that, upon the occurrence of particular events, make calls into the function library 208 to cause the runtime tracing component 116 to log the events. The manifest 202, dynamic tracing code 210, and other components to implement the described techniques can be installed using standard privileges (e.g., without requiring administrative privileges), which make it easier for developers to take advantage of tracing functionality. For example, modern application tracing techniques discussed herein may be implemented by applications 110 and/or dynamic tracing code 210 that is installed on a per user basis using standard privileges.

In response, the runtime tracing component 116 executes appropriate functions when called to translate the calls into static events compatible with tracing APIs 114. In particular, the functions provided by the function library 208 convert the calls into events in the expected format designated by the manifest 202. The runtime tracing component 116 then interacts with the tracing APIs 114 on behalf of the application 110 to log the events in the tracing log 118.

For instance, the runtime tracing component 116 calls the tracing APIs 114 with the events created through the function library 208. As also shown in FIG. 2, legacy applications 212 can interact directly with the tracing APIs 114 to provide compatible events for logging in an expected format. In this way, the tracing APIs 114 may be implemented to handle event logging calls from both modern and legacy applications. Because the runtime tracing component 116 converts functions calls from modern applications to an expected format for static events, the tracing APIs 114 are able to handle calls without awareness of the kind of application providing the call or operation of the runtime tracing component 116.

In response to event logging calls, the tracing APIs 114 operate to write the events to the tracing log 118 as logged events 214. In at least some embodiments, the runtime tracing component 116 further operates to locate and/or obtain descriptive metadata 206 for events being logged by modern applications. The runtime tracing component 116 employs this information to include decoding data 216 along with corresponding events. For example, decoding data 216 may be embedded in log files along with corresponding logged events 214. The decoding data 216 may include actual metadata 206 for an event, pointers to appropriate metadata 206, and/or other data sufficient to enable decoding of corresponding events. In this manner, log files are self-contained and are decodable using decoding data 216 embedded within the log files themselves. Further details regarding these and other aspects of modern application tracing techniques are provided in relation to the following example procedures.

Example Procedures

The following discussion describes modern application tracing techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the example scenario 200 of FIG. 2.

Figure 3:
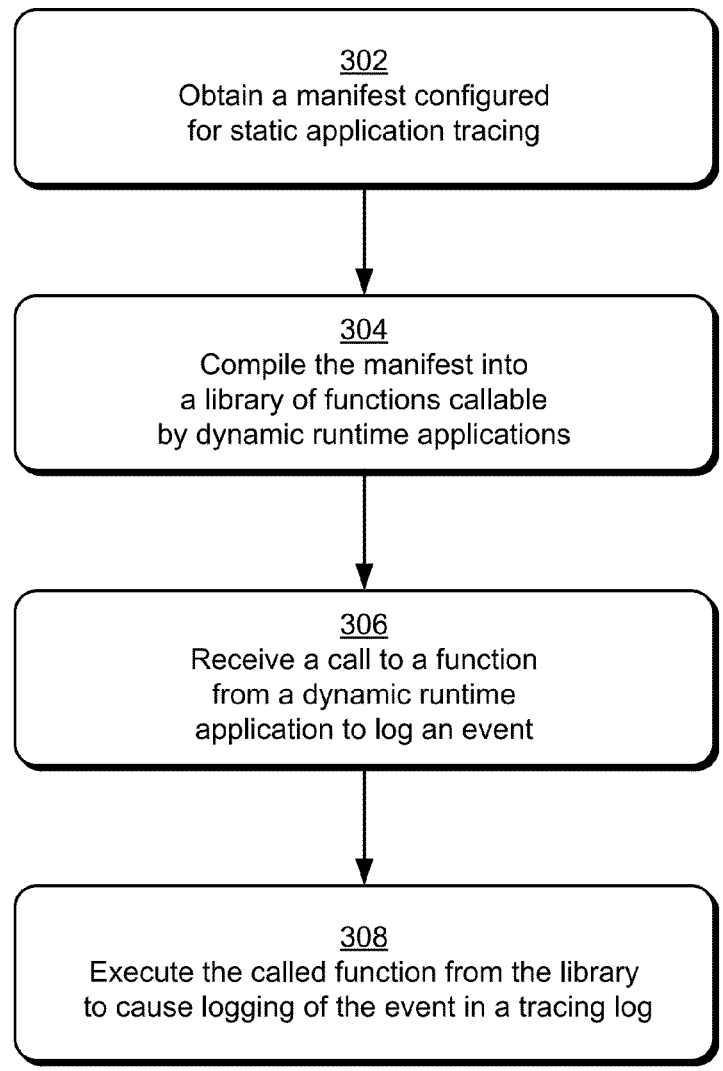
FIG. 3 is a flow diagram depicting a procedure in an example implementation in which functions to enable modern application tracing are created.

FIG. 3 depicts a procedure 300 in an example implementation in which functions are created to enable modern application tracing. A manifest is obtained that is configured for static application tracing (block 302). For example, the runtime tracing component 116 may obtain an existing manifest or a new manifest that is written in a traditional format used for static application tracing. The manifest 202 may be obtained from local storage at a computing device 102 or from a suitable remote storage location accessible to the computing device 102. In general, the manifest 202 defines events for tracing in terms of parameters and metadata using a format that may be used directly for decoding with legacy applications in traditional tracing scenarios.

The manifest is compiled into a library of functions callable by dynamic runtime applications (block 304). For example, the runtime tracing component 116 may covert the static manifest into functions that are compatible with dynamic runtime applications (e.g., "modern applications"). This may involve creating individual functions for each of the events defined in the manifest. Thus, the conversion may produce a function library 208 that includes a plurality of functions that may be called by dynamic runtime applications. In particular, the functions may be called through tracing code 210 with which applications 110 are instrumented. In at least some embodiments, the function library 208 corresponding to the manifest is created as a dynamic link library (dll) that contains the various functions. Unlike the manifest 202, the created dll does not have headers and metadata describing tracing events. Rather, the dll provides a set of functions corresponding to the events described in the manifest 202.

A call to a function is received from a dynamic runtime application to log an event (block 306). For instance, an instrumented application can include tracing code 210 that is configured to detect and respond to different events. In particular, the tracing code 210 can be configured to make calls to functions in the function library 208 created in the manner described herein. The runtime tracing component 116 may be configured to expose the dll containing the function library 208 and handle calls made to the functions.

The called function from the library is executed to cause logging of the event in a tracing log (block 308). For instance, the call made to a particular function is received and executed through the runtime tracing component 116. Here, the dynamic call from dynamic code is translated into an event in a static format that is understandable by existing tracing APIs 114. The runtime tracing component 116 may then provide the event to the tracing APIs 114 on behalf of the application to cause logging of the event in a tracing log 118. Thus, the runtime tracing component 116 acts as an intermediary between dynamic code and static tracing APIs that facilities logging of events from the dynamic code using existing tracing components designed for static applications.

Figure 4:
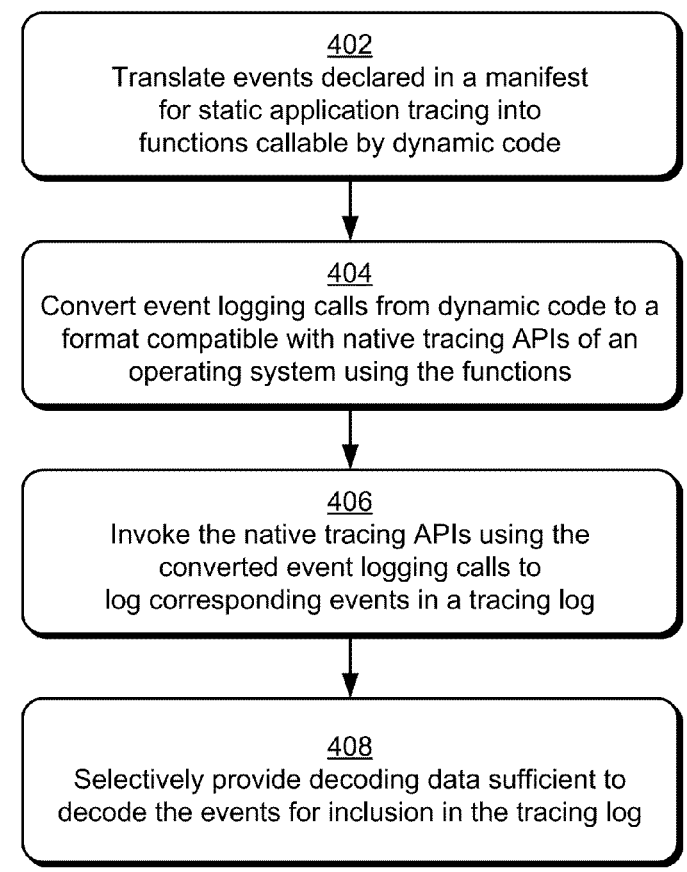
FIG. 4 is a flow diagram depicting a procedure in an example implementation in which functions derived from a static manifest are used to invoke native tracing features of an operating system.

FIG. 4 depicts a procedure 400 in another example implementation in which functions derived from a static manifest are used to invoke native tracing features of an operating system. In at least some embodiments, a runtime tracing component 116 may be configured to create or otherwise provide a function library 208 using one or more manifests 202 in the manner previously described. The runtime tracing component 116 may then expose the function library 208 to handle calls from dynamic code.

In particular, events declared in a manifest for static application tracing are translated into functions callable by dynamic code (block 402). For example, each event declared in a manifest 202 can be translated to a corresponding function. In one approach, the translation is performed by the runtime tracing component 116 at a computing device 102. To do so, the runtime tracing component 116 may parse the manifest file and translate events defined therein one by one. Additionally or alternatively, the runtime tracing component 116 may include or otherwise make use of a library of functions having at least some pre-translated functions. For instance, the runtime tracing component 116 may be configured to access and use a function library 208 available from a remote source, such as from a website of a developer that creates and maintains the function library 208 for access by clients. In this case, the runtime tracing component 116 may access the function library 208 on-demand over a network and/or download the function library 208 for storage locally at a computing device 102.

Event logging calls from dynamic code are converted to a format compatible with native tracing APIs of an operating system using the functions (block 404). Native tracing APIs are invoked using the converted event logging calls to log corresponding events in a tracing log (block 406). For example, the functions derived from the manifest 202 are configured to take calls from dynamic code as input and process the calls to produce events in a static form as output. In other words, the functions of the function library 208 operate to generate appropriate calls to native tracing APIs 114 based on calls made to the functions by tracing code 210 placed within dynamic applications. Here, the runtime tracing component 116 may make calls into the native tracing APIs 114 on behalf of modern applications using the static events generated through the functions. From the perspective of the native tracing APIs 114, the calls made by the runtime tracing component 116 appear the same as calls from static applications and are handled in the same manner. Thus, the native tracing APIs 114 may handle logging for both modern applications and static applications without being modified and without awareness of modern applications and/or processing that is performed by the runtime tracing component 116 on behalf of the modern applications.

Decoding data sufficient to decode the events is selectively provided for inclusion in the tracing log (block 408). For instance, the runtime tracing component 116 may optionally provide decoding data in conjunction with calls made to the native tracing APIs 114. In general, the decoding data enables interpretation of the log data and events described therein. In traditional techniques, decoding may be dependent upon an external static manifest that defines the events. If the static manifest is not installed or is otherwise unavailable, decoding of the log may be difficult or even impossible. Providing decoding data within the tracing log 118 itself produces a self-contained log that can be decoded without having to install or rely upon an external manifest. Further, details regarding techniques for selective inclusion of decoding data within a tracing log 118 are discussed in relation to the following example procedure of FIG. 5.

Figure 5:
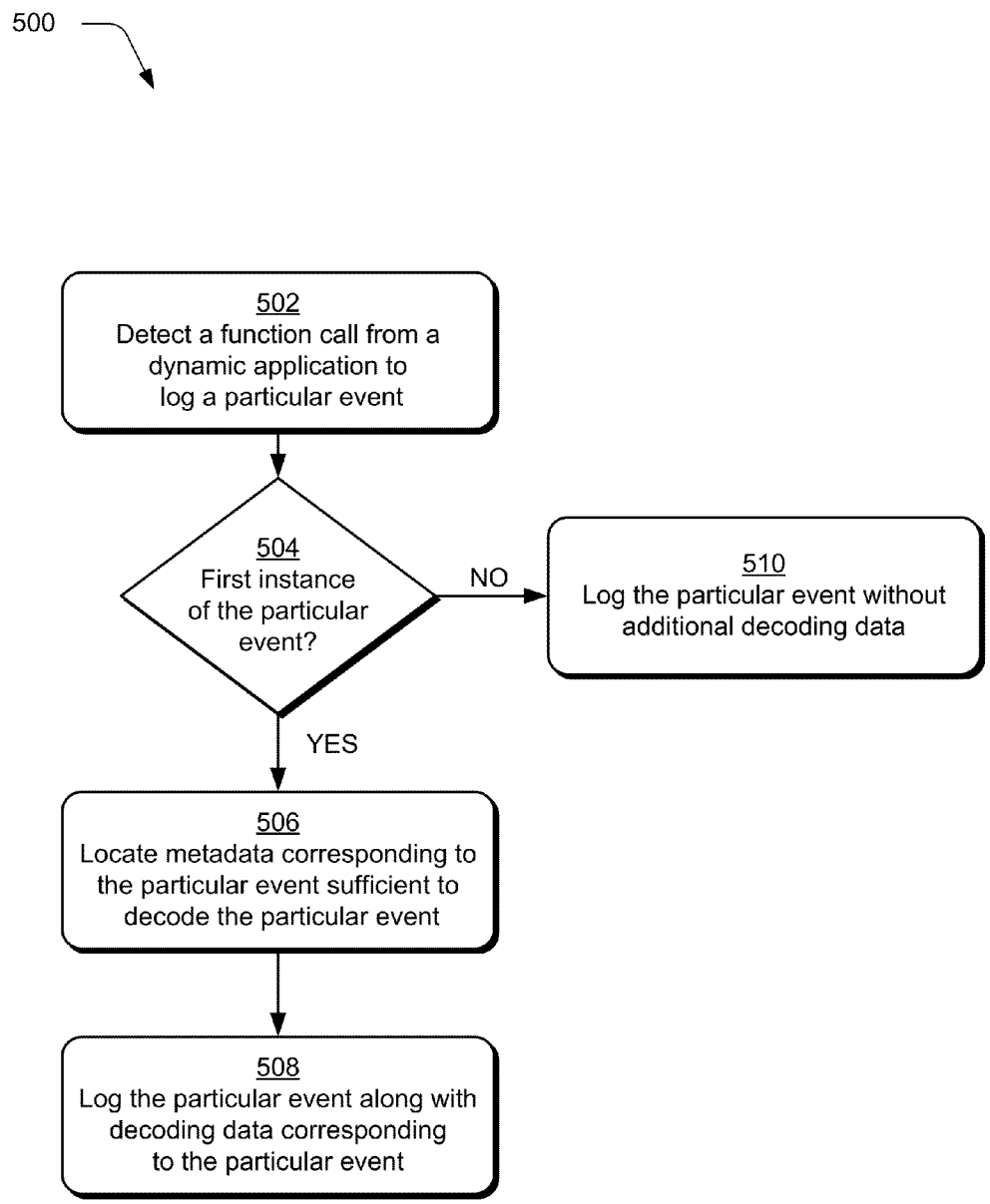
FIG. 5 is a flow diagram depicting a procedure in an example implementation in which decoding data to decode events is selectively embedded with log files.

In particular, FIG. 5 depicts a procedure 500 in an example implementation in which decoding data sufficient to decode events is selectively embedded with log files. A function call from a dynamic application to log a particular event is detected (block 502). For example, a call initiated by tracing code of an application may be received and processed by the runtime tracing component 116 as discussed previously. A determination is made regarding whether or not the call is a first instance of the particular event (block 504). For example, the runtime tracing component 116 may track different kinds of calls and identify when a first instance of a particular event is received. The identification can be based upon suitable identifiers, such as an event name, event ID, or other identifying data placed in calls made by tracing code 210.

When the call is a first instance of the particular event, metadata corresponding to the particular event is located that is sufficient to decode the particular event (block 506) and the particular event is logged along with decoding data corresponding to the particular event (block 508). For example, metadata 206 defining a corresponding event 204 may be located from a manifest 202. The runtime tracing component 116 may use the metadata 206 to generate a decoding data item. The decoding data item may be configured as another separate log entry that is entered into the tracing log 118 each time a first instance of an event is encountered. The decoding data item may also be provided as one or more parameters that are added to and therefore combined with a log entry for a corresponding event. In some embodiments, the decoding data item may be configured to include a link, URL, or other pointer that can be used to locate metadata 206 for a corresponding event. Resources for the metadata 206 may be stored in a binary file, such as a dll created for the function library 208 or another suitable resource file. Additionally or alternatively, the decoding data item may include embedded metadata 206 that defines the event.

On the other hand, when the call is not a first instance of the particular event, the particular event is logged without additional decoding data (block 510). In this case, additional decoding data is not added because the log already contains data sufficient to decode the particular event. In this manner, a self-contained log may be produced without carrying decoding data for each individual log entry/event. Thus, the decoding data is added to a log file once for each different kind of event, which keeps the log file relatively small in size.

In another approach, the runtime tracing component 116 can make a determination of whether or not a decoding data item for a particular event already exists within a tracing log 118. This may occur by examining the log to find decoding data item that matches a particular event when a call is received from an application. Decoding data may then be added to the log if a decoding data item does not already exist. Otherwise, the event may be logged without adding another (e.g., duplicate) decoding data item.

Example System

Figure 6:
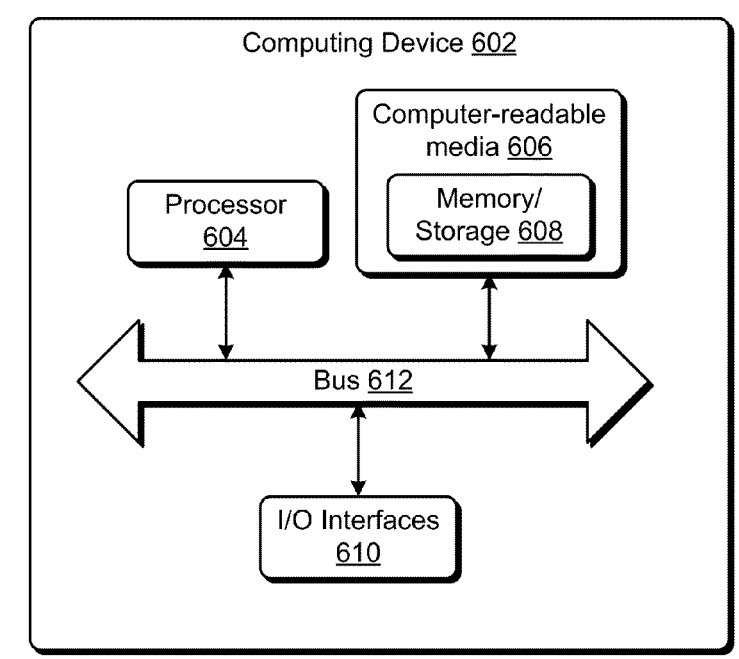
FIG. 6 depicts an example computing system that can be used to implement one or more embodiments of modern application tracing techniques.

FIG. 6 illustrates an example system generally at 600 that includes an example computing device 602 that is representative of one or more such computing systems and/or devices that may implement the various embodiments described above. The computing device 602 may be, for example, a server of a service provider, a device associated with the computing device 102 (e.g., a client device), a system on-chip, and/or any other suitable computing device or computing system.

The example computing device 602 includes one or more processors 604 or processing units, one or more computer-readable media 606 which may include one or more memory and/or storage components 608, one or more input/output (I/O) interfaces 610 for input/output (I/O) devices, and a bus 612 that allows the various components and devices to communicate one to another. Computer-readable media 606 and/or one or more I/O devices may be included as part of, or alternatively may be coupled to, the computing device 602. The bus 612 represents one or more of several types of bus structures, including a memory bus or memory controller, a peripheral bus, an accelerated graphics port, and a processor or local bus using any of a variety of bus architectures. The bus 612 may include wired and/or wireless buses.

The one or more processors 604 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. The memory/storage component 608 represents memory/storage capacity associated with one or more computer-readable media. The memory/storage component 608 may include volatile media (such as random access memory (RAM)) and/or nonvolatile media (such as read only memory (ROM), Flash memory, optical disks, magnetic disks, and so forth). The memory/storage component 608 may include fixed media (e.g., RAM, ROM, a fixed hard drive, etc.) as well as removable media (e.g., a Flash memory drive, a removable hard drive, an optical disk, and so forth).

Input/output interface(s) 610 allow a user to enter commands and information to computing device 602, and also allow information to be presented to the user and/or other components or devices using various input/output devices. Examples of input devices include a keyboard, a touchscreen display, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software, hardware (fixed logic circuitry), or program modules. Generally, such modules include routines, programs, objects, elements, components, data structures, and so forth that perform particular tasks or implement particular abstract data types. An implementation of these modules and techniques may be stored on or transmitted across some form of computer-readable media. The computer-readable media may include a variety of available medium or media that may be accessed by a computing device. By way of example, and not limitation, computer-readable media may include "computer-readable storage media" and "communication media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. Computer-readable storage media also includes hardware elements having instructions, modules, and/or fixed device logic implemented in a hardware form that may be employed in some embodiments to implement aspects of the described techniques.

The computer-readable storage media includes volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, hardware elements (e.g., fixed logic) of an integrated circuit or chip, or other storage device, tangible media, or article of manufacture suitable to store the desired information and which may be accessed by a computer.

"Communication media" may refer to a signal bearing medium that is configured to transmit instructions to the hardware of the computing device, such as via a network. Communication media typically may embody computer readable instructions, data structures, program modules, or other data in a modulated data signal, such as carrier waves, data signals, or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

Combinations of any of the above are also included within the scope of computer-readable media. Accordingly, software, hardware, or program modules, including the tracing APIs 114, runtime tracing component 116, operating system 108, applications 110, and other program modules, may be implemented as one or more instructions and/or logic embodied on some form of computer-readable media.

Accordingly, particular modules, functionality, components, and techniques described herein may be implemented in software, hardware, firmware and/or combinations thereof. The computing device 602 may be configured to implement particular instructions and/or functions corresponding to the software and/or hardware modules implemented on computer-readable media. The instructions and/or functions may be executable/operable by one or more articles of manufacture (for example, one or more computing devices 602 and/or processors 604) to implement techniques for modern application tracing, as well as other techniques. Such techniques include, but are not limited to, the example procedures described herein. Thus, computer-readable media may be configured to store or otherwise provide instructions that, when executed by one or more devices described herein, cause various techniques for modern application tracing.

CONCLUSION

Although the invention has been described in language specific to structural features and/or methodological acts, it is to be understood that the appended claims are not necessarily limited to the specific features or acts described. Rather, the specific features and acts are disclosed as example forms of implementing the claimed subject matter.

What is claimed is:
1. A method implemented by one or more computing devices, the method comprising:
compiling a manifest configured for static application tracing into a library of functions callable by a dynamic runtime application including translation of one or more static events declared in the manifest for static application tracing into respective functions for inclusion in the library;
receiving a call to a function in the library of functions from the dynamic runtime application to log an event; and
executing the called function to cause logging of the event in a tracing log of the computing device.
2. The method as described in claim 1, wherein the manifest defines the static events for logging in the tracing log through native tracing functionality of an operating system of the computing device.
3. The method as described in claim 2, wherein the function operates to convert the call to a static event compatible with the native tracing functionality of the operating system.

4. The method as described in claim 3, wherein the native tracing functionality of the operating system comprises one or more tracing application programming interfaces (APIs).

5. The method as described in claim 4, wherein the compiling, receiving, and executing are performed using a runtime tracing component provided as an intermediate layer between dynamic code and the tracing application programming interfaces (APIs) of the operating system.

6. The method as described in claim 5, wherein the tracing application programming interfaces (APIs) enable logging of events received both directly from static applications and indirectly from dynamic applications through the runtime tracing component.

7. The method as described in claim 1, wherein the dynamic runtime application comprises non-compiled dynamic code implemented by a corresponding runtime platform and installed on a per user basis using standard privileges.

8. The method as described in claim 1, wherein executing the called function comprises:
converting the call to a format compatible with tracing application programming interfaces (APIs) of an operating system of the computing device; and
invoking the tracing APIs using the converted call to log the event in the tracing log.

9. The method as described in claim 8, wherein converting the call comprises converting the call to a static event in a format defined by the manifest.

10. The method as described in claim 1, further comprising including decoding data sufficient to decode the event along with the event in the tracing log.

11. The method as described in claim 1, wherein compiling the manifest comprises creating individual functions corresponding to each of a plurality of static events defined in the manifest.

12. A method implemented by one or more computing devices, the method comprising:
declaring events in a manifest to enable logging of events from static code in a tracing log directly through native tracing application programming interfaces (APIs) of an operating system of the computing device; and
enabling logging of events from dynamic code in the tracing log through an intermediate runtime tracing component configured to:
translate the events declared in the manifest to functions callable by the dynamic code;
convert event logging calls received from the dynamic code to a format compatible with the native tracing APIs using the functions; and
invoke the native tracing APIs using the converted event logging calls to log corresponding events in the tracing log.

13. A method as described in claim 12, wherein the runtime tracing component is further configured to selectively include decoding data sufficient to decode the events from the dynamic code in the tracing log.

14. A method as described in claim 12, wherein the static code comprises statically compiled applications and the dynamic code comprises non-compiled dynamic applications implemented by a corresponding runtime platform.

15. A method as described in claim 12, wherein the runtime tracing component is implemented as an intermediate layer between the dynamic code and the native tracing application programming interfaces (APIs).

16. One or more computer-readable storage media storing instructions that, when executed by a computing device, implement a runtime tracing component to:
translate one or more events declared in a manifest for static application tracing into respective functions callable by dynamic code;
convert event logging calls received from the dynamic code to static events compatible with native tracing application programming interfaces (APIs) of an operating system using the functions;
invoke the native tracing APIs using the converted event logging calls to log corresponding events in a tracing log; and
include decoding data sufficient to decode the events within the tracing log.

17. One or more computer-readable storage media as described in claim 16, wherein inclusion of decoding data sufficient to decode the events comprises, for each event logging call received from the dynamic code:
determining whether the call is a first instance of a particular event;
when the call is the first instance, log the particular event along with decoding data; and
when the call is not the first instance, log the particular event without additional decoding data.

18. One or more computer-readable storage media as described in claim 16, wherein inclusion of decoding data sufficient to decode the events comprises entering decoding data as a separate event in the tracing log each time a first instance of an event is encountered.

19. One or more computer-readable storage media as described in claim 16, wherein the decoding data comprises pointers to one or more locations having metadata defining the events.

20. One or more computer-readable storage media as described in claim 16, wherein translation of the one or more events into respective functions comprises creating a dynamic link library (dll) that contains the respective functions.

* * * * *